(12) United States Patent
Davidson et al.

(10) Patent No.: US 9,718,318 B2
(45) Date of Patent: Aug. 1, 2017

(54) TIRE CHAIN TOOL

(71) Applicants: James Ayton Davidson, Kamloops (CA); Kevin Eigeard, Kamloops (CA)

(72) Inventors: James Ayton Davidson, Kamloops (CA); Kevin Eigeard, Kamloops (CA)

( * ) Notice: Subject to any disclaimer, the term of this patent is extended or adjusted under 35 U.S.C. 154(b) by 17 days.

(21) Appl. No.: 14/863,223

(22) Filed: Sep. 23, 2015

(65) Prior Publication Data
US 2016/0082793 A1 Mar. 24, 2016

Related U.S. Application Data

(60) Provisional application No. 62/054,252, filed on Sep. 23, 2014.

(51) Int. Cl.
*B25B 27/22* (2006.01)
*B60C 27/00* (2006.01)

(52) U.S. Cl.
CPC ............ *B60C 27/003* (2013.01); *B25B 27/22* (2013.01)

(58) Field of Classification Search
CPC ............................... B25B 27/22; B60C 27/003
USPC ................................................ 7/118; 81/15.8
See application file for complete search history.

(56) References Cited

U.S. PATENT DOCUMENTS

| | | | |
|---|---|---|---|
| 1,150,260 A | 8/1915 | Featheringill | |
| 1,238,647 A * | 8/1917 | Derby | B60C 27/14 81/15.8 |
| 1,254,934 A | 1/1918 | Pool | |
| 1,337,534 A | 4/1920 | Uglow | |
| 1,386,413 A | 8/1921 | Lavoie | |
| 1,448,230 A | 12/1921 | Mohrman | |
| 1,411,884 A | 4/1922 | Geiger | |
| 1,435,099 A * | 11/1922 | Beltz | B25B 27/22 29/267 |
| 1,435,881 A * | 11/1922 | Shough | B62D 55/32 30/190 |
| 1,453,874 A | 5/1923 | Hotchkiss | |
| 1,542,629 A * | 6/1925 | Massuere | B25B 27/22 81/15.8 |
| 1,602,419 A | 10/1926 | Staggers et al. | |
| 1,674,691 A | 6/1928 | Marsh | |
| 1,839,715 A | 1/1932 | Terrell | |
| D143,233 S * | 12/1945 | Moore | D8/43 |

(Continued)

FOREIGN PATENT DOCUMENTS

GB 360672 11/1931

*Primary Examiner* — Joseph J Hail
*Assistant Examiner* — Tyrone V Hall, Jr.
(74) *Attorney, Agent, or Firm* — Richard D. Okimaw (57) ABSTRACT

An apparatus for applying chains to a tire comprises an elongate member having c-shaped opening at a first end thereof and a handle at a second end thereof. The apparatus further includes a slot therethrough adapted to support a key rotatable between a first position contained within the slot and a second position extending perpendicularly from the slot. A method of applying tire chains comprises engaging a link of a tire chain within the c-shaped opening and drawing the link of the tire chain into engagement with a binder located at a distal end of the tire chain. The method further comprises locating the binder within the c-shaped opening, rotating the binder into a closed position with the elongate member, rotating a key out of the slot, engaging the key within a lock in the tire chain and locking the tire chain with the key.

8 Claims, 9 Drawing Sheets

(56) References Cited

U.S. PATENT DOCUMENTS

| | | | |
|---|---|---|---|
| 2,982,326 A | | 5/1961 | Cruickshank |
| 3,142,903 A | * | 8/1964 | Stiller ..................... B67B 7/44 |
| | | | 30/450 |
| 5,621,936 A | * | 4/1997 | Penaligon ............ A44B 15/005 |
| | | | 206/234 |
| 6,752,040 B1 | * | 6/2004 | Paul-Alexandre .... B67B 7/0423 |
| | | | 81/3.09 |
| 7,007,572 B2 | | 3/2006 | Woodworth et al. |
| 9,266,227 B2 | * | 2/2016 | Schroeder ............... B25B 25/00 |

* cited by examiner

TIRE CHAIN TOOL

CROSS REFERENCE TO RELATED APPLICATION

This Application claims priority from U.S. Provisional Patent Application No. 62/054,252 filed Sep. 23, 2014 entitled Tire Chain Tool.

BACKGROUND OF THE INVENTION

1. Field of Invention

The present invention relates to tire chains in general and in particular to an apparatus for installing use in tire chains on a vehicle.

2. Description of Related Art

Tire chains are a common apparatus which are applied to the exterior surface of tires to provide enhanced grip in winter or other slippery conditions. One common design for tire chains, which in particular may be used on trucks, comprises a pair of chains sized to extend around the tire to each side thereof with a plurality of crossed chains extending there between. Such main chain members, typically include a latching arm extending from one end designed to engage a free distal end at the other end of the chain. In order to secure such a chain, the latch engages the free distal and is thereafter rotated to draw the two ends closer together whereafter the latch is locked. Subsequently, tightening cams may be utilized to further tighten the chains as are commonly known.

One difficulty with such conventional chain design is that it may be difficult for a truck operator to apply the chance to the truck in the field. In particular, it is frequently difficult for the truck driver to apply a sufficient force to the free end of the chain to sufficiently tighten the chain around the tire. Therefore, one frequently used method of applying such tire change it to first engage the end of the tire chain together and secondly to drive the truck forward a short distance so was to take up any remaining slack in the chain thereafter the cam maybe re-tightened and locked securing a change in place. Disadvantageously, such methods of applying tire chains may prove time-consuming and difficult to do for an operator in cold or snowy conditions.

SUMMARY OF THE INVENTION

According to a first embodiment of the present invention there is disclosed an apparatus for applying chains to a tire comprising an elongate member having c-shaped opening at a first end thereof and a handle at a second end thereof. The apparatus further includes a slot therethrough adapted to support a key rotatable between a first position contained within the slot and a second position extending perpendicularly from the slot.

The key may have a substantially square distal end. The key may have tabs extending therefrom for engagement by a user to rotate the key between the first and second positions.

The c-shaped opening may be formed by first and second fingers with an opening therebetween. The -shaped opening may be sized to engage a link of a tire chain. The c-shaped opening may be located along a first side of the elongate member.

The apparatus may further include a hook along a second side of the elongate member. The hook may have a tapered outward facing edge. The handle may include a weighted distal end.

According to a first embodiment of the present invention there is disclosed a method for applying chains to a tire comprising engaging a link of a tire chain within a c-shaped opening located at a first end of an elongate member and drawing the link of the tire chain into engagement with a binder located at a distal end of the tire chain while located around a tire. The method further comprises locating the binder within the c-shaped opening, rotating the binder into a closed position with the elongate member, rotating a key out of a slot within the handle, engaging the key within a lock in the tire chain and locking the tire chain with the key.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention wherein similar characters of reference denote corresponding parts in each view.

DETAILED DESCRIPTION

Figure 1:
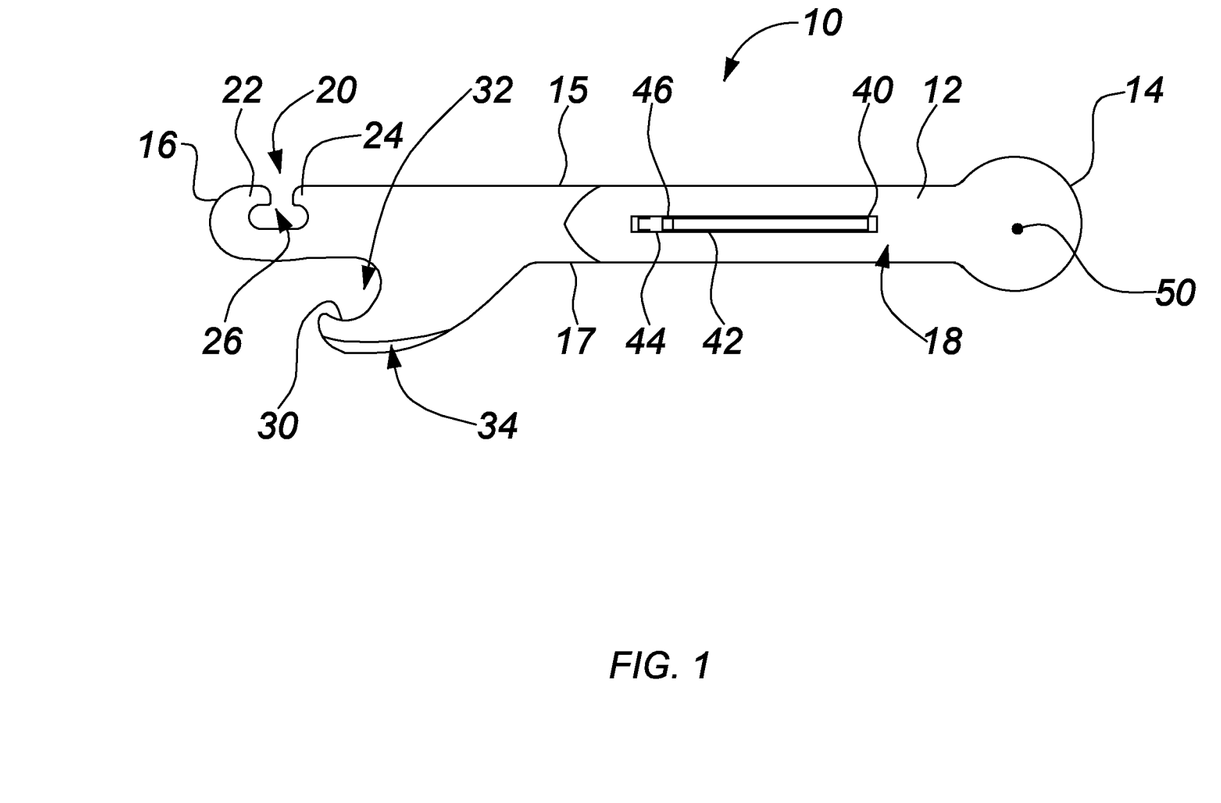
FIG. 1 is a plan view of a tool for use in changing tire chains according to a first embodiment of the present invention.
Figure 8:
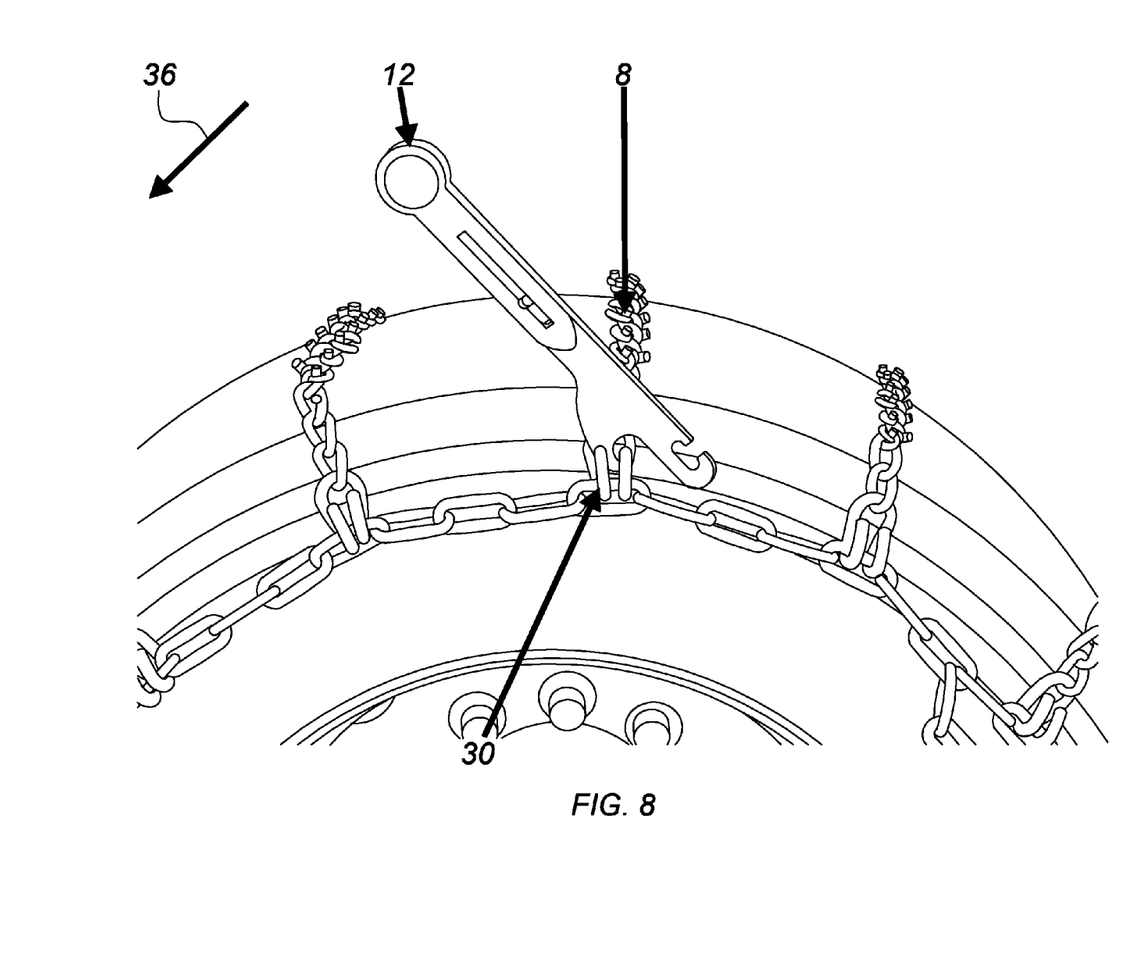
FIG. 8 is a perspective view of the use of the apparatus of FIG. 1 for prying open links of a cross chain.

Referring to FIG. 1, an apparatus for assisting the application of tire chains to a tire according to a first embodiment of the invention is shown generally at 10. The apparatus 10 comprises an elongate member 12 extending between first and second and, 14 and 16, respectively. The first end 14 forms a handle 18 of conventional size for griping by a user. The second end 16 includes a c-shaped opening 20 for engaging a link of a tire chain as will be more fully described below The c-shaped opening 20 is proximate to the second end 16 of the elongate member. The c-shaped opening 20 is formed by first and second fingers 22 and 24 with a gap 26 therebetween. The gap and the c-shaped opening are sized to be able to receive a link of a chain there through. As illustrated, the c-shaped opening 20 extends into a first side edge 15 of the elongate member 12. A second side edge 17 of the elongate member may also include a hook 30 oriented back towards the elongate member 12 so as to form a void therebetween for engaging a link of a cross-tire chain. The hook 30 may have a tapered edge 34 oriented away from the elongate member adapted to be located between and pry apart an end link of a cross-chain 8 as illustrated in FIG. 8 when the elongate member is rotated in a direction generally indicated at 36.

Figure 2:
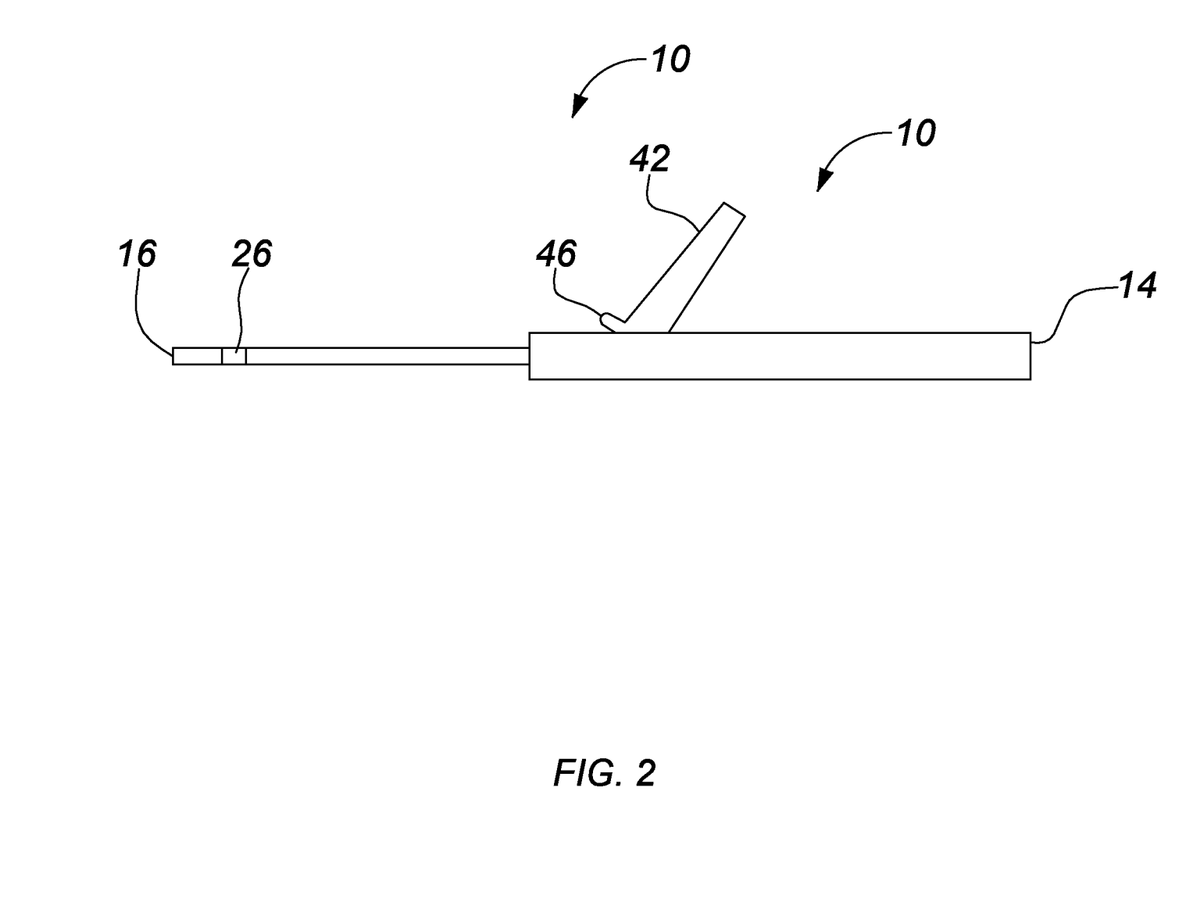
FIG. 2 is a side view of the tire chain tool of FIG. 1.
Figure 3:
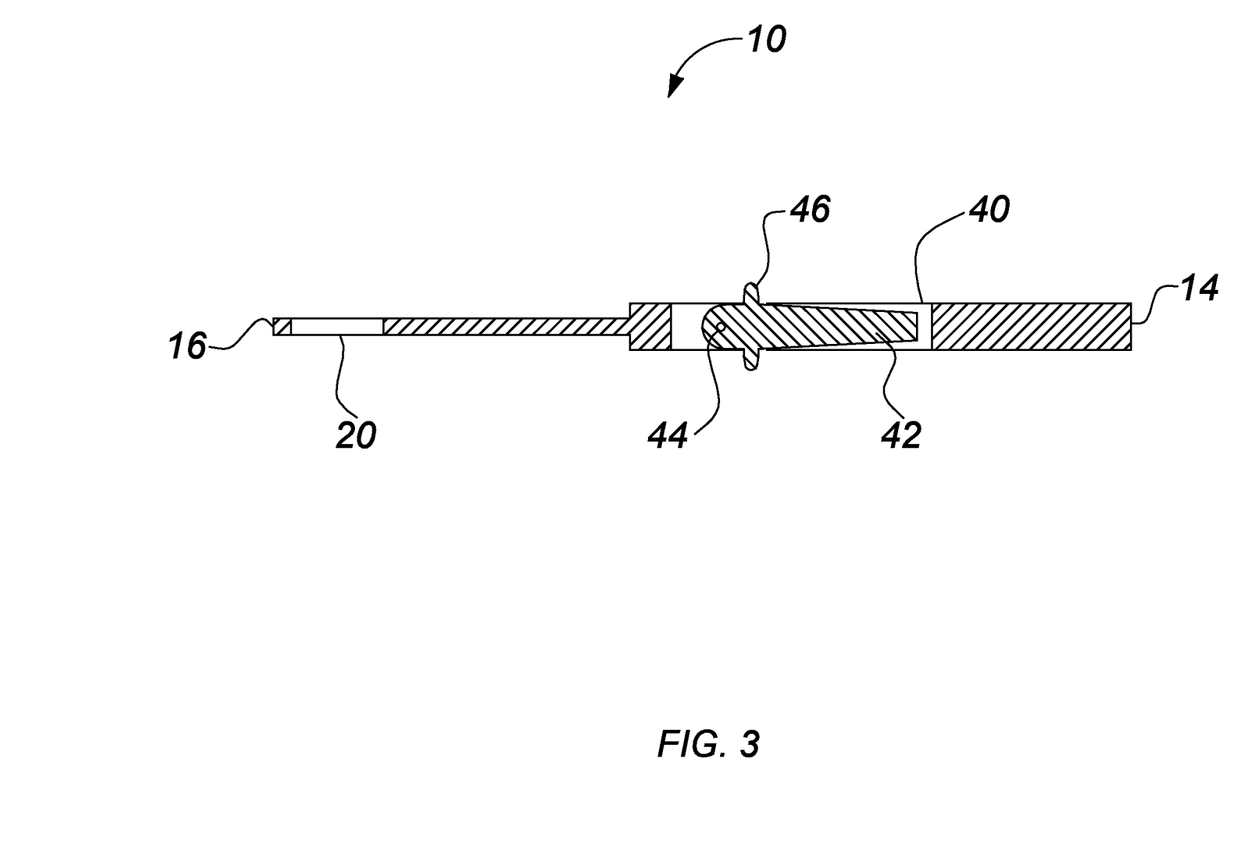
FIG. 3 is a cross sectional view of the tire chain tool of FIG. 1 with the key at a first position.
Figure 4:
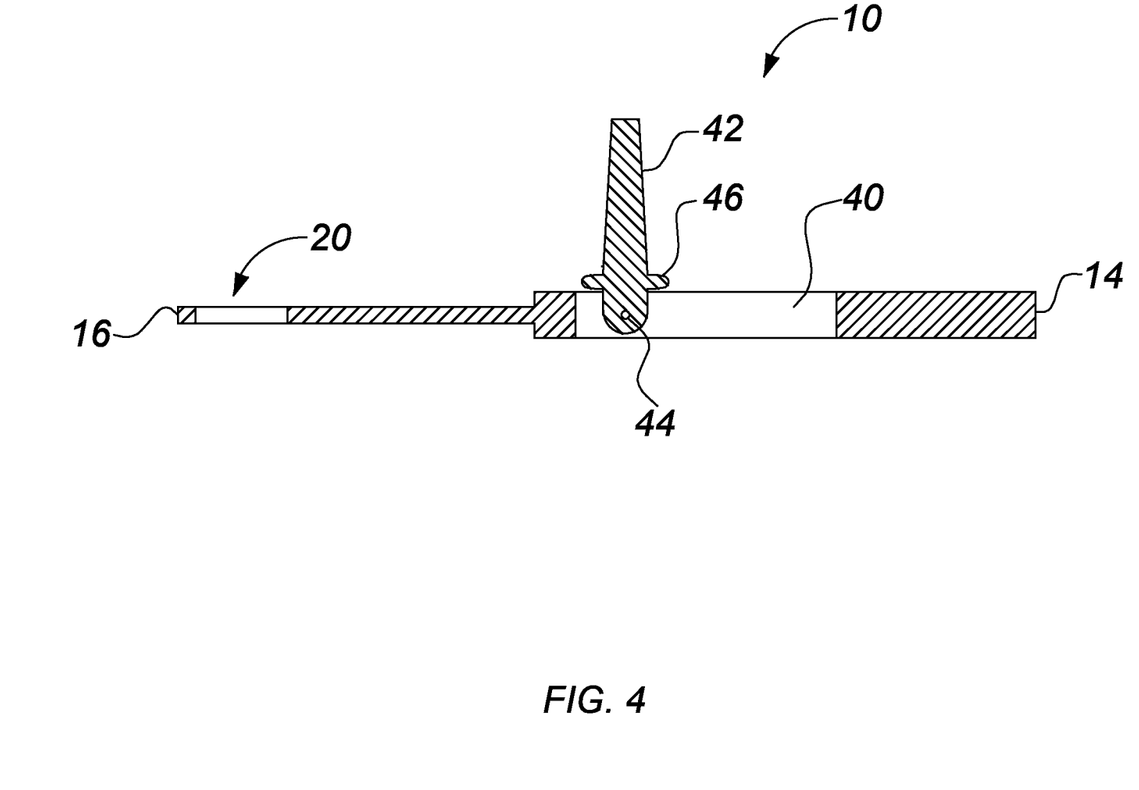
FIG. 4 is a cross sectional view of the tire chain tool of FIG. 1 with the key at a second position.

The handle portion 18 includes a slot 40 extending therethrough which pivotally supports a key 42 therein. As illustrated in FIG. 2, the key may be pivotally supported within the slot so as to be rotatable between a first or stored position as illustrated in FIG. 3 and a second or extended position as illustrated in FIG. 4. The key 42 include a pin 44 extending therethrough received within bores in the handle so as to be pivotable therein. Additionally, the key 42 may include extension tabs 46 extending substantially perpendicularly from a length thereof so as to provide a surface for a user to grip or press upon to rotate the key 42 out of the slot. As illustrated in FIG. 3, the extension tabs 46 have a length sufficient to extend from the slot when the key 42 is in the first or stored position. The key 42 has a distal end 48 adapted to fit within a conventional cam lock of a tire chain as are conventionally known. As illustrated, the handle 18 includes an enlarged portion 50 proximate to the first end 14 of the elongate member. This enlarged portion 50 will be useful as a hammer for removing snow and mud from the tire or chain as well as for use in checking tire pressure by banging against the tire as is commonly known.

The elongate member 12 is formed of a durable material having high strength to resist the forces applied to it. Examples of suitable materials include, steel and stainless steel. The apparatus may also desirably have all or a portion thereof painted in a highly visible color to aid in locating a dropped apparatus in snow or the like. The elongate handle may have a length selected to permit ease of storage within a vehicle while providing adequate mechanical advantage to the operation of installing tire chains. By way of non-limiting example, it has been found that an overall length of between 12 and 14 inches (305 and 356 mm) has been useful although other lengths may be useful as well.

Figure 5:
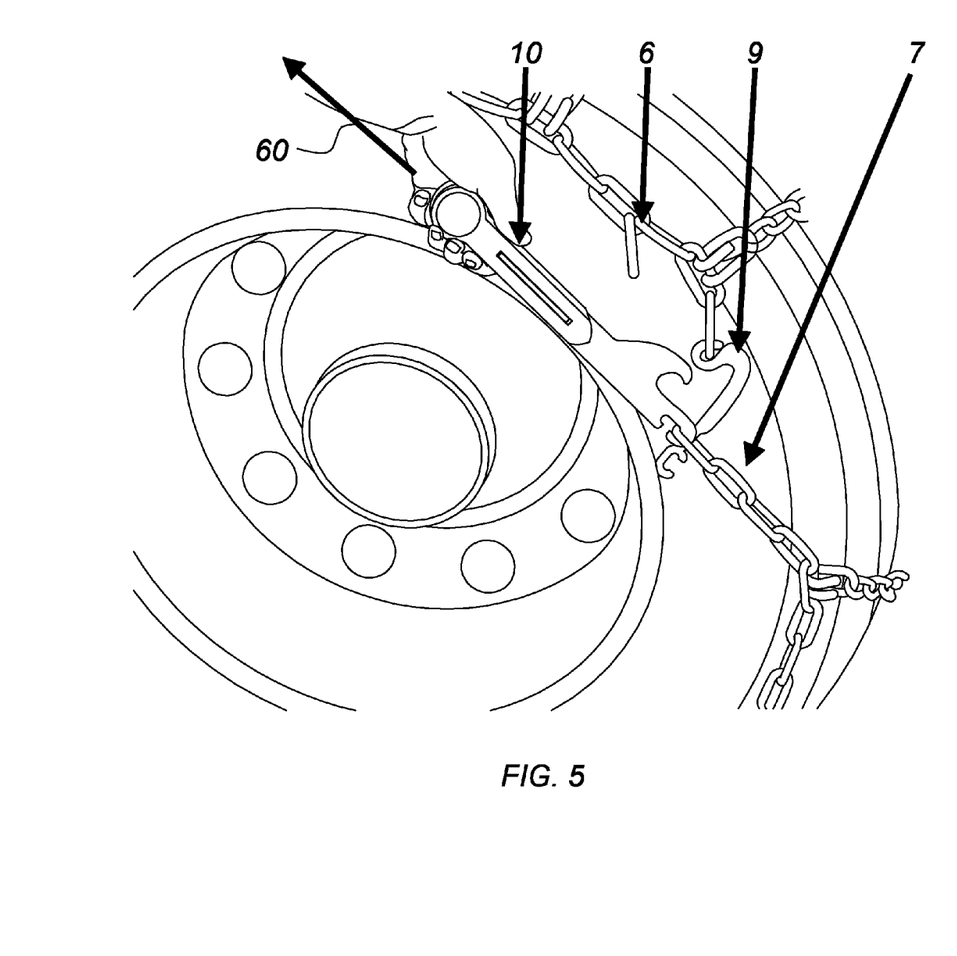
FIG. 5 is a perspective view of a use of the apparatus of FIG. 1 at a first step.
Figure 6:
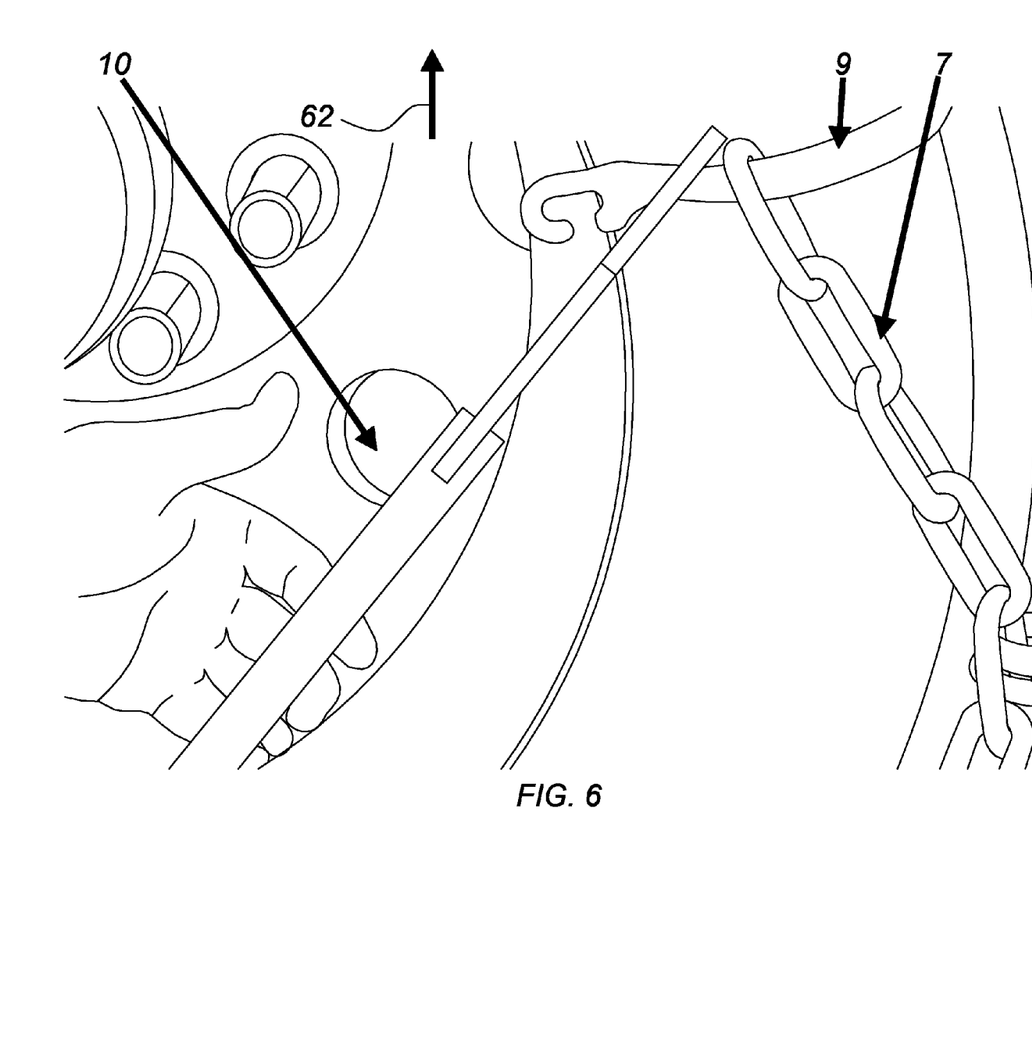
FIG. 6 is a perspective view of the use of the apparatus of FIG. 1 at a second step.
Figure 7:
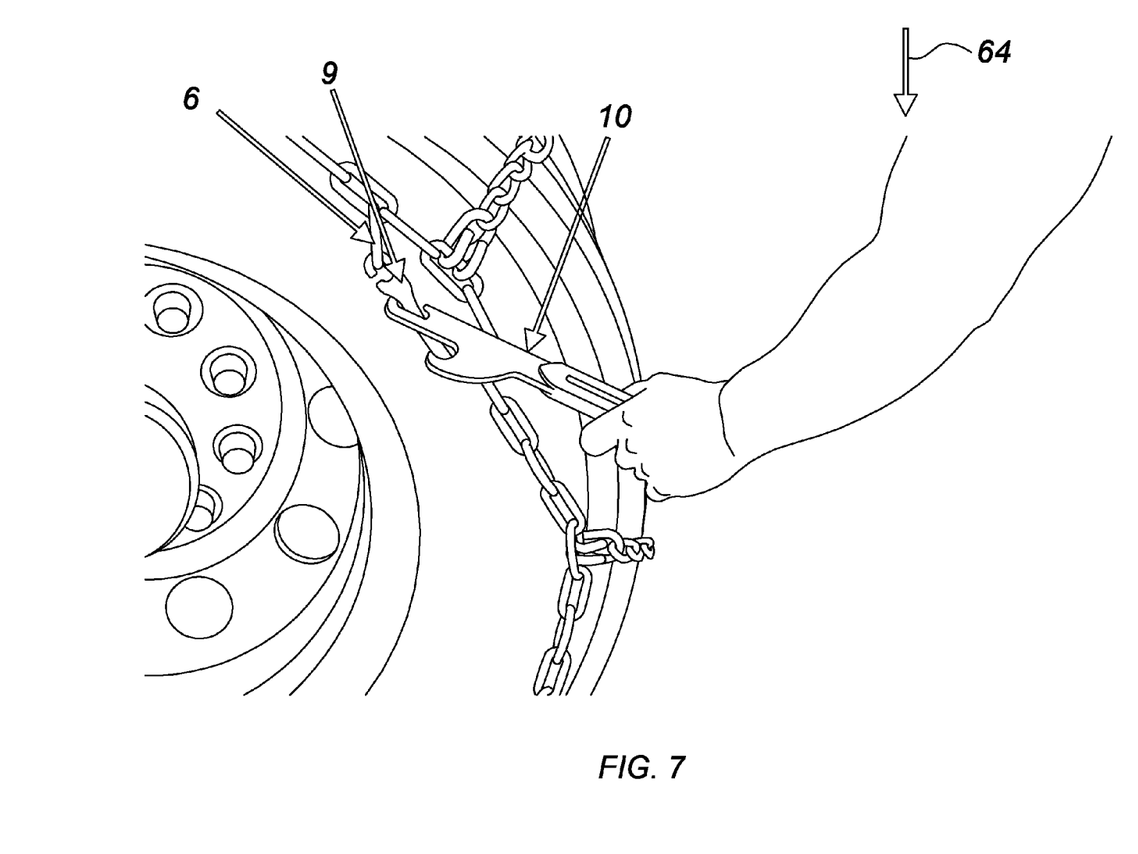
FIG. 7 is a perspective view of the use of the apparatus of FIG. 1 at a third step.

With reference to FIGS. 5 through 7, in operation, a tire chain 6 may be located over a tire according to known methods. Thereafter the c-shaped opening 20 of the present apparatus is hooked into a link 7 of the free end of the tire chain and the apparatus utilized to pull the free end towards the end binder 9 in a direction generally indicated at 60. As illustrated in FIG. 6, after the link 7 has been engaged upon the end binder 9, the c-shaped channel 20 may thereafter be placed around the end binder 9 so as to provide a mechanical advantage in rotating the end binder 9 in a direction indicated at 62 whereupon the end binder is secured in the locked position with a free link of the tire chain as is commonly known. Optionally, the elongate member 12 may be extended along the end binder in a direction back towards the pivot of the end binder and rotated in a direction generally indicated at 64. Once the end binder has been secured, the key 42 may be extended from the handle to the second position illustrated in FIG. 4 and utilized to lock the cam locks as are commonly known.

Figure 9:
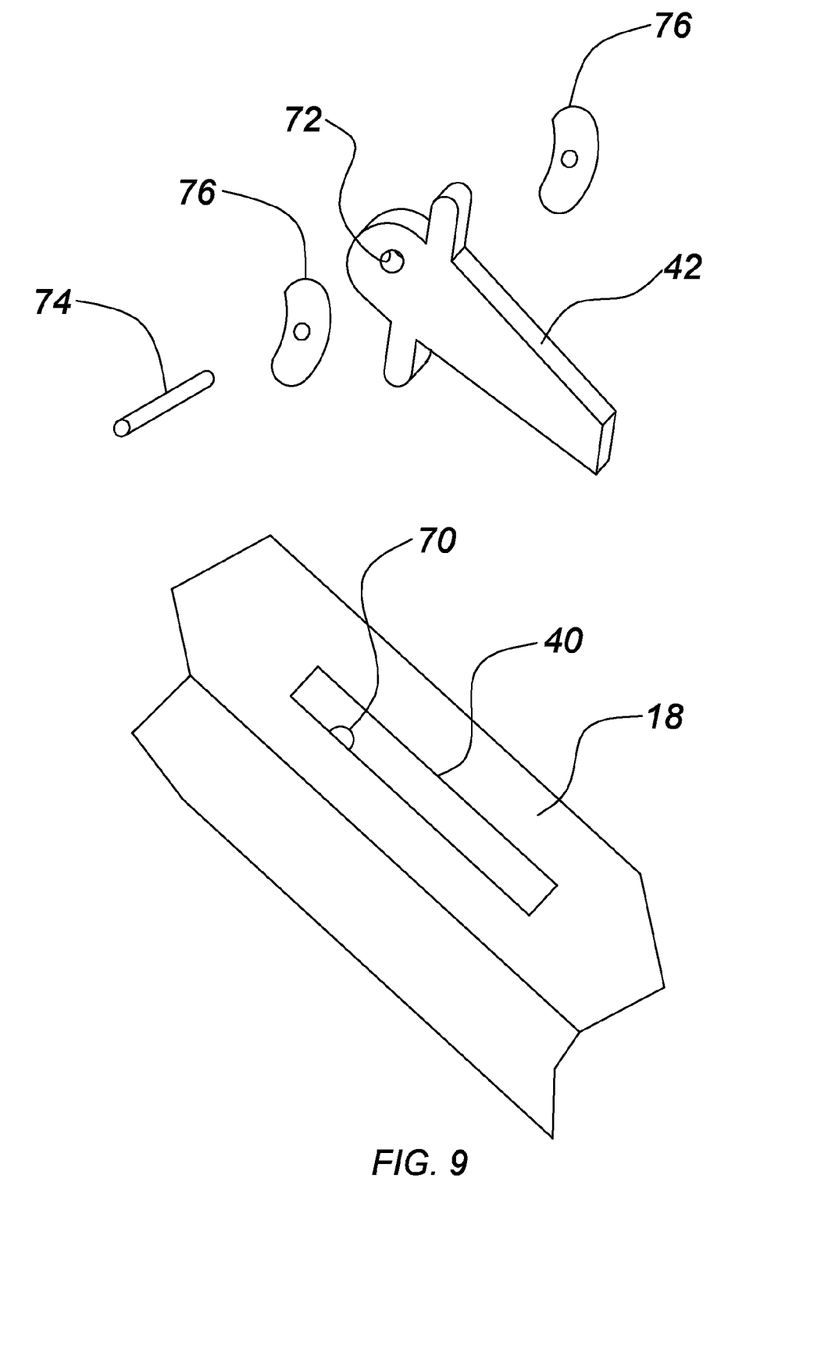
FIG. 9 is a detailed exploded view of the key assembly of the apparatus of FIG. 1.

With reference to FIG. 9, the slot 40 may include a slot bore 70 extending into the sides thereof. The key 42 includes a corresponding key bore 72 sized to receive a pin 74 between the slot bores 70. The key 42 may optionally includes washers 76 which are concavely bent to one or both side thereof around the pin so as to provide a biasing force to the key 42 thereby maintaining the key 42 at a desired orientation relative to the handle 18.

While specific embodiments of the invention have been described and illustrated, such embodiments should be considered illustrative of the invention only and not as limiting the invention as construed in accordance with the accompanying claims.

What is claimed is:

1. An apparatus for applying chains to a tire comprising:
an elongate member extending between first and second ends having a c-shaped opening at said first end thereof and a handle proximate to said second end thereof, said shaped opening having fingers adjacent to an entrance thereto extending towards each other so as to define a gap narrower than a main body of said c-shaped opening;
a slot through said elongate member transverse to said c-shaped opening;
a bulbous weighted end at said second end of said elongate member;
a key rotatably supported within said slot between a first position contained within said slot and a second position extending perpendicularly from said slot, and
a hook along a second side of said elongate member.

2. The apparatus of claim 1 wherein said key has a substantially square distal end.

3. The apparatus of claim 2 wherein said key has tabs extending therefrom for engagement by a user to rotate said key between said first and second positions.

4. The apparatus of claim 1 wherein said c-shaped opening is formed by first and second fingers with an opening therebetween.

5. The apparatus of claim 4 wherein said c-shaped opening is sized to engage a link of a tire chain.

6. The apparatus of claim 4 wherein said c-shaped opening is located along a first side of said elongate member.

7. The apparatus of claim 1 wherein said hook has a tapered outward facing edge.

8. The apparatus of claim 1 wherein said handle includes a weighted distal end.

\* \* \* \* \*